H. H. F. DANGER.
CHANGE SPEED BELT DRIVE.
APPLICATION FILED APR. 22, 1920.
1,396,168.
Patented Nov. 8, 1921.
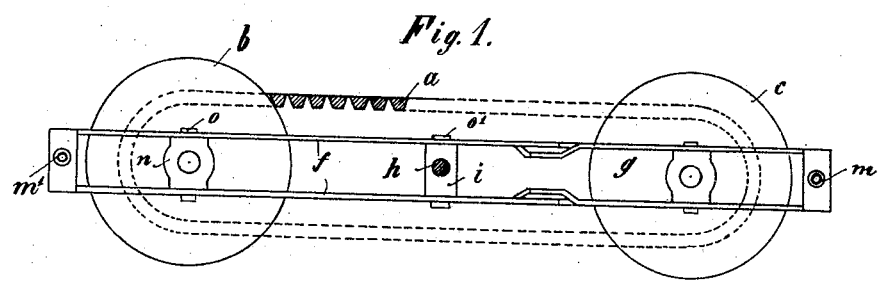
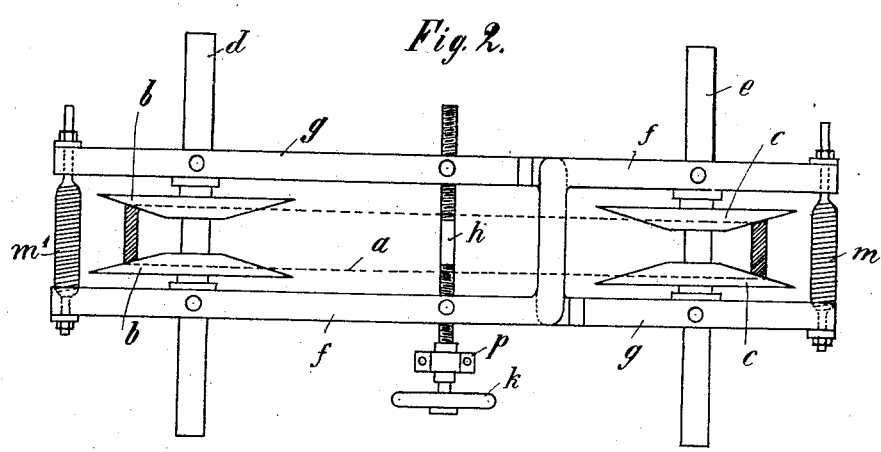
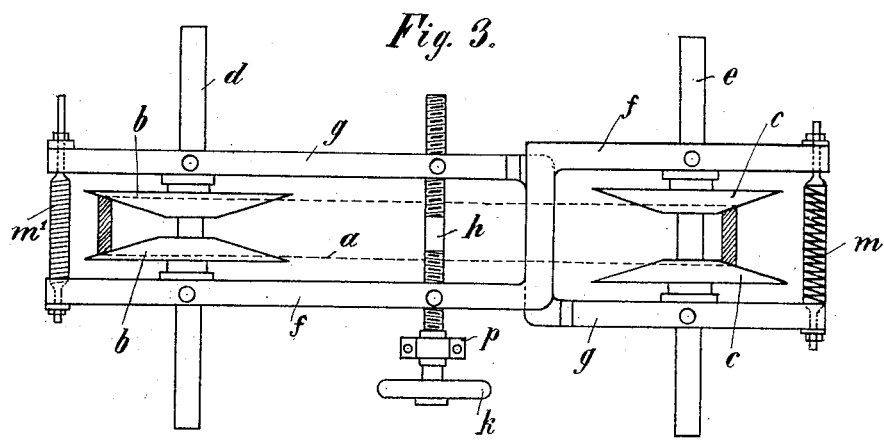
Inventor:
Hans Hinrich Friedrich Danger
By Lawrence Langner
Attorney.

UNITED STATES PATENT OFFICE.

HANS HINRICH FRIEDRICH DANGER, OF HAMBURG, GERMANY.

CHANGE-SPEED BELT-DRIVE.

1,396,168.   Specification of Letters Patent.   Patented Nov. 8, 1921.

Application filed April 22, 1920. Serial No. 375,854.

*To all whom it may concern:*

Be it known that I, HANS HINRICH FRIEDRICH DANGER, citizen of Hamburg, residing at Hamburg, in Germany, have invented certain new and useful Improvements in a Change-Speed Belt-Drive, (for which I have filed an application in Germany April 10, 1919,) of which the following is a specification.

This invention refers to a change speed belt drive, in which the belt runs on two pairs of conical pulleys and in which the change of speed is obtained by increasing the distance of the pulleys of one pair and reducing the distance of the pulleys of the other pair from one another.

Since in changing the rate of speed, the increase of the length of that part of the belt, which surrounds the enlarged diameter, is greater than the shortening of that part of the belt, which surrounds the decreased diameter, an overstraining of the belt on one pair and a loosening of the belt on the other pair of pulleys would take place, when the pulleys of both pairs are shifted equally. In order to avoid this inconvenience, adjusting devices are provided, which shift the pulleys differently. By this means, however, the equal tension of the belt on both pulley pairs is not arrived at in changing the rate of speed. The reason of this is, that the shifting of the disks takes place unyieldingly in strict dependence from the adjusting device.

In the change speed belt drive according to the present invention the pair of conical pulleys are journaled between rails, which are made in the shape of a Z connected to one another movably by an adjusting device, for instance a screw spindle, by means of which the two rails can be conveniently adjusted in such manner that the pulleys of one pair are moved toward one another, while the pulleys of the other pair move away from one another. Since the rails with regard to the adjusting devices can be moved rotatably, the belt on adjusting, when a straining takes place, is enabled to push the pulleys in counteraction to the adjustment somewhat asunder, so as to balance the straining action on both pairs of conical pulleys and on further adjusting by the adjusting device, the proper rate of speed will be obtained. This regulation of the rails or disks preventing an overstraining of the belt will be assisted thereby that the ends of the rails are connected with one another by springs counteracting any resistance.

Figure 1 of the drawing shows a side view of the change speed belt drive diagrammatically and Figs. 2 and 3 are plans in two different positions, the belt being shown in section.

In the construction shown, the belt by way of example consists of a chain or hick belt $a$ surrounding the pairs of conical pulleys $b$, $b$ and $c$, $c$, which are arranged axially movable, but unrotatable on the shafts $d$ and $e$ respectively. These shafts are journaled between two pairs of rails $f$ and $g$, which are made in the shape of a Z, as shown, by means of bearing blocks $n$, which are rotatably fastened to the rails by studs $o$. Intermediate of the two shafts $d$ and $e$ a left and right hand threaded screw spindle $h$ is screwed into left and right hand threaded nuts $i$, rotatably fastened by means of the studs $o'$ between the pairs of rails $f$ and $g$ respectively. The screw spindle $h$, which is journaled on a fixed part $p$, carries at its outer end a hand wheel $k$, by the rotation of which the distance between the pairs of rails $f$ and $g$ is changed. The pairs of rails $f$ and $g$ are connected with one another at their ends by spiral springs $m$ and $m'$, the tension of which can be regulated by any known means, to hold the rails in their proper position.

In the position shown in Fig. 2 the shafts $d$ and $e$ rotate with equal speed and the pulleys of each pair are equally apart.

When it is desired to allow the shaft $e$ to run at a greater speed than the shaft $d$, the hand wheel $k$ is so rotated that the blocks $i$ approach one another. The consequence is, that also the pulleys $b$ approach one another, while the pulleys $c$ will be moved away from one another. Between the pulleys $c$ the belt will be loosened, while between the pulleys $b$ it will be spanned. This spanning or tensioning of the belt counteracts the movement of the disks, so that a balancing of the tensioning of the belt takes place at both pairs of pulleys, until by further adjustment the desired rate of speed is attained. This adjustment is assisted by the springs $m$ and $m'$, which also balance the resistance of the pulley pairs against shifting. The fact is that the rails next to the pair of pulleys $b$ approach one another, while they move away from one another next to the pairs of pulleys $c$. Therefore the spring $m$ will be tensioned to a greater extent, while the spring $m'$ will be reduced in tension. The consequence is that by the spring $m$, owing to the Z-shaped formation of the rails $f$ and $g$ and owing to the tendency to rotate about the blocks $i$, a counteracting compression takes place near the pulleys $b$.

I claim:

1. A change speed belt drive, comprising two pairs of conical pulleys, two shafts, on each of which one pair of the said pulleys is secured unrotatably, but axially movably, two Z-shaped rails, on which the two shafts are journaled, means to adjust the distance between the rails.

2. A change speed belt drive, comprising two pairs of conical pulleys, two shafts, on each of which one pair of the said pulleys is secured unrotatably, but axially movably, two Z-shaped rails, on which the two shafts are journaled and a screw spindle adapted to adjust the distance between the two rails.

3. A change speed belt drive, comprising two pairs of conical pulleys, two shafts, on each of which one pair of said pulleys is secured unrotatably, but axially movably, two pairs of rails, Z-shaped, bearing blocks for the shafts rotatably secured between the pairs of rails and a screw spindle adapted to adjust the distance between the two pairs of rails.

4. A change speed belt drive, comprising two pairs of conical pulleys, two shafts, on each of which one pair of said pulleys is secured unrotatably, but axially movably, two pairs of rails Z-shaped, bearing blocks for the shafts rotatably secured between the pairs of rails, a screw spindle adapted to adjust the distance between the two pairs of rails, a left and right hand threaded screw spindle and nuts rotatably attached between the pair of rails opposite one another, through which nuts the screw spindle is threaded.

5. A change speed belt drive, comprising two pairs of conical pulleys, two shafts, on each of which one pair of said pulleys is secured unrotatably, but axially movably, two pairs of rails Z-shaped, bearing blocks for the shafts rotatably secured between the pairs of rails, a screw spindle adapted to adjust the distance between the two pairs of rails and springs connecting the ends of the Z-shaped pairs of rails.

HANS HINRICH FRIEDRICH DANGER.

Witnesses:
F. A. MAX KAEMPFF,
EMIL HAGER.